April 14, 1925.
D. NOBLE
1,533,205
CLUTCH MECHANISM
Filed Nov. 6, 1919
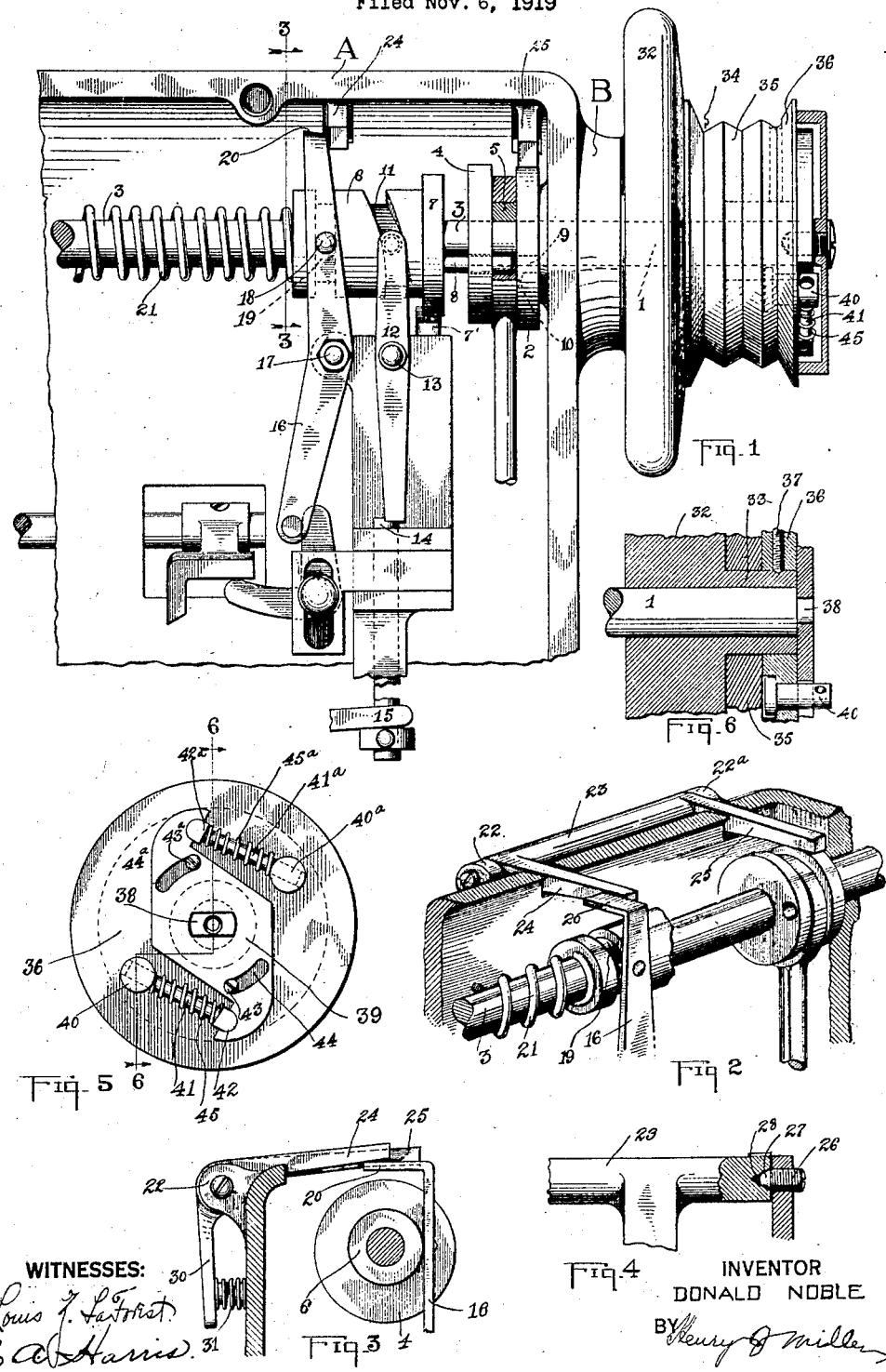
INVENTOR
DONALD NOBLE
BY *Henry J. Miller*
ATTORNEY
WITNESSES:

Patented Apr. 14, 1925.

1,533,205

UNITED STATES PATENT OFFICE.

DONALD NOBLE, OF BRIDGEPORT, CONNECTICUT, ASSIGNOR TO THE SINGER MANUFACTURING COMPANY, A CORPORATION OF NEW JERSEY.

CLUTCH MECHANISM.

Application filed November 6, 1919. Serial No. 335,983.

*To all whom it may concern:*

Be it known that I, DONALD NOBLE, a subject of the King of Great Britain, residing at Bridgeport, in the county of Fairfield and State of Connecticut, have invented certain new and useful Improvements in Clutch Mechanisms, of which the following is a specification, reference being had therein to the accompanying drawings.

In the use of clutches of the type where mating positive clutch elements carried by the drive and driven shafts are relatively moved to and from clutching engagement to clutch the drive and driven shaft in a definite angular relationship, trouble has been experienced at high speeds in properly engaging elements when their relative motion towards each other is initiated very shortly prior to the shafts assuming their angular driving relation. This trouble has been particularly frequent in clutch mechanisms of that type comprising a pin movable axially of the driven shaft and engaging a perforation in a collar carried by the drive shaft, a late movement of the pin toward the collar causing the edge of the perforation to engage the end of the pin, resulting often in the chipping or breaking of one or both parts.

It has been found in practice that if the pin does not start its movement toward the collar while the perforation is at a substantial angular distance from its line of movement defective clutching, as above described, is likely to occur.

This invention provides means for preventing defective clutching by making it impossible for the movable clutch element to start toward clutching position at too short a time before the angular drive relation of the drive and driven shafts is assumed, while permitting such action when sufficient time to secure proper clutching engagement is available.

To further add to the certainty of action of the clutch, this invention also provides means whereby the shock of sudden starting of the driven mechanism, which in the usual pin-and-perforation construction is exerted directly on the pin, is largely absorbed by cushioning springs.

In the accompanying drawings, the present improvement is shown embodied in the perforating machine forming the subject of my Patent No. 1,376,897, dated May 3, 1921.

Fig. 1 represents a fragmentary elevation of a portion of the actuating mechanism of the punching machine of said patent showing the invention applied thereto;

Fig. 2 is a fragmentary perspective with parts broken away;

Fig. 3 is a partial cross section along the line 3—3 of Fig. 1, the parts between the sleeve 6 and cam 2 being removed to avoid confusion and others shown somewhat diagrammatically for clearness of illustration;

Fig. 4 is a detail partly in section of a rock shaft bearing;

Fig. 5 is an end view of the drive pulley, the cover plate being removed; and

Fig. 6 is a fragmentary cross section on the line 6—6 of Fig. 5.

In these drawings, A represents a portion of the machine frame having a boss B thereon, in which is journaled a drive shaft 1 carrying thereon external of the frame A suitable drive pulleys. Within the frame A shaft 1 carries thereon a cam disc 2. Mounted within the frame and in alignment with shaft 1, is a driven shaft 3 carrying adjacent the cam 2 a disc 4 and an eccentric 5, the eccentric 5 being for the purpose of driving certain machine mechanisms not material to this invention. Slidably carried on shaft 3, but fixed to rotate therewith, is a sleeve 6, having an enlarged collar portion 7 at one end thereof and carrying a clutch pin 8 in the face thereof adjacent the collar 4. Collar 7 is formed as a stop cam having a stop lug arranged when sleeve 6 is in one position to contact with a stop 7' carried by the machine frame to stop the rotation of sleeve 6 and shaft 3 in a definite angular position. Pin 8 projects through guiding perforations in the disc 4 and eccentric 5, and at suitable times may engage in a perforation 9 in the cam disc 2 to clutch the shafts 1 and 3 for simultaneous rotation, the perforation 9 having an inclined guideway 10 leading thereto to insure the proper seating of the pin 8 therein.

The sleeve 6 is provided with a cam groove 11 therein to cooperate with a cam follower carried by the upper end of a lever 12 journaled at 13 to a fixed portion of the frame A, the lower end of lever 12 engaging at certain times a latch pin 14 slidably mounted in the machine frame to be moved into and out of the path of the lever 12. An arm 15 by which this pin may be retracted is herein shown, and a spring (not shown) may be utilized, as represented in my said patent, to normally hold latch pin 14 at its upper limit of motion projecting within the path of the lever 12. A second lever 16 is pivoted at a fixed point 17 on the frame, and is provided with a cam follower 18 engaging within a circumferential groove 19 in the sleeve 6, lever 16 terminating at its upper end in a bent portion 20. The lower end of lever 16 is shown as engaging other parts of the machine, but as their action is immaterial to this invention, they will not be described. A coil spring 21 surrounding the shaft 3, and bearing at one end against the sleeve 6 urges sleeve 6 longitudinally of shaft 3 toward the cam disc 2. The coil spring 21 and the lever 12, stop 14 and cam 11 constitute automatic means under the control of the operator for throwing the clutch into and out of action. That is, the spring 21 acts automatically to shift the driven clutch element 8 into engagement with the driving clutch element when the stop-pin 14 is drawn downwardly by the operator. The cam 11 and lever 12 act automatically to shift the driven clutch element away from the driving clutch element when the stop 14 is projected upwardly by the operator so as to engage the lever 12.

Carried by brackets 22 and 22ᵃ on the outer face of the casing A, is a rock shaft 23 having forwardly extending stop and follower arms 24, 25, projecting through the casing and with the end of the arm 25 normally in contact with the cam disc 2. As shown in Fig. 4, rock shaft 23 is mounted between the brackets 22 and 22ᵃ by means of threaded pintle pins such as shown at 26 passing through brackets 22, 22ᵃ, and having conical bearing faces such as 27 engaging within conical recesses 28 in the ends of the rock shaft 23.

Rock shaft 23 has a depending arm 30, and a coil spring 31 bears between the lower end of arm 30 and the casing A tending to hold the rock shaft 23 in position with the arm 25 bearing against the cam disc 2.

The cam disc 2 is so proportioned and positioned that the arm 25 is in lower position with stop arm 24 in the path of end 20 of lever 16 when the perforation 9 is closely approaching alignment with the pin 8, and is raised by cam disc 2 to raise arm 24 when the perforation 9 has passed alignment with the pin 8 and held raised until the pin 8 again approaches within a certain angular distance of alignment with said perforation. As shown, the portion 20 is formed with a bevel, the amount of which is exaggerated in Fig. 1 to more clearly illustrate its action. Thus, the stop 24 is periodically moved into effective position by the cam-disk 2 to prevent release of the collar 7 and clutch-pin 8.

The drive pulleys are mounted on the shaft 1 in the following manner. The hand wheel 32 loose on shaft 1 is formed with an integral sleeve portion 33 (see Fig. 6), and is also provided with a belt pulley portion 34 on the side adjacent the sleeve 33. A loose pulley 35 is journaled on the sleeve 33, and a pulley 36 is made fast by a pin or screw 37 to the sleeve 33 beyond the loose pulley 35. It is intended that two belts traveling at different speeds shall be used together, these belts resting in adjacent pulley grooves, whereby one will engage one of the fixed pulleys 34 or 36, while the other will engage the loose pulley 35, a double belt shifter (not shown) being employed to shift the belts simultaneously, by which means the speed of the drive shaft 1 may be varied. The outer end of shaft 1 is cut away forming a substantially rectangular boss 38. Adjacent the face of pulley 36 a plate 39 is fitted over the boss 38, whereby it is held from rotation relative to shaft 1. Studs 40, 40ᵃ are rotatably held within the pulley 36 as shown in Figs. 5 and 6, their outer ends being perforated for the reception of guide rods 41, 41ᵃ, terminating at one end in abutments 42, 42ᵃ bearing in mating seats in the plate 39. Plate 39 is allowed a limited rotary movement independent of the pulley 36 by means of the screws 43, 43ᵃ fast in pulley 36 and engaging in curved slots 44, 44ᵃ in plate 39. Coil springs 45, 45ᵃ surrounding the rods 41 and 41ᵃ bear at one end against the abutments 42, 42ᵃ and at the other end against the pins 40, 40ᵃ, whereby the plate 39 is yieldingly held at one limit of its motion relative to the pulley 36, this limit being such that the rotation of pulley 36 in its driving direction will allow a limited forward movement thereof compressing the springs 45, 45ᵃ before a positive connection with the plate 39 and consequently with the shaft 1 is effected.

The operation of this mechanism is as follows: Motion is imparted to the shaft 1 by means of either one of the fixed pulleys 34 or 36, acting through the springs 45, 45ᵃ, and at certain times also through the pins 43, 43ᵃ and plate 39 through boss 38. This causes a rotation of the cam 2, which normally imparts an up-and-down motion to the arm 25 to rock the shaft 23 and impart a similar up-and-down motion to the arm 24. When the shaft 3 is in unclutching position the parts are as shown in Fig. 1; in the angular relation of the parts there shown, pin 8 being in alignment with the perforation 9 and the stop lug on collar 7 in contact with stop 7′. At this time, arm 25 is in its lowered position, arm 24 also being in its lowered position adjacent the end 20 of the lever 16, thus preventing lever 16 from rocking movement about its pivot 17 in a direction to allow the sleeve 6 to approach the cam 2 to effect clutching engagement of pin 8 in the perforation 9 to clutch the shafts. Upon further rotation of shaft 1 relative to shaft 3 the high portion of cam 2 comes in contact with the arm 25 thus raising it and consequently arm 24 until the latter is out of the path of movement of the forward edge of portion 20. If now the pin 14 be retracted out of contact with the lower end of lever 12, spring 21 acting against the sleeve 6 moves it toward the cam 2 so that on subsequent alignment of the pin 8 and perforation 9 the pin will be free to be projected therein to clutch the shafts 1 and 3 at the same time moving the stop lug on collar 7 out of contact with the stop 7' to release shaft 3 for rotation. Movement of the sleeve 6 into clutching position also brings the beveled portion 20 under the arm 24 serving to raise this arm slightly, thereby raising arm 25 slightly out of contact with the cam 2, this action, (shown exaggerated in Fig. 3, cam 2 and sleeve 6 being shown somewhat diagrammatically) serving to eliminate noise and wear due to the high portion of the cam contacting at each revolution with the arm 25.

Rotation of the shaft 3 also rotates the sleeve 6, whereby the cam groove 11 serves to oscillate the lever 12 at each revolution. On projection of the pin 14 in the path of lever 12, lever 12 is prevented from oscillation, whereupon the follower on lever 12 acting in the cam groove 11, retracts pin 8 from engagement with perforation 9 to unclutch the shaft 3, and brings collar 7 in alignment with stop 7' which engages the stop lug to stop shaft 3 in a definite angular position. This action removes the portion 20 of the lever 19 from beneath the arm 24 and spring 31 thereupon brings the arm 25 into contact with the cam 2, which now acts during a portion of each revolution of shaft 1 just prior to the perforation 9 coming into alignment with pin 8 to prevent initial motion of the sleeve 6 toward clutching position as above described.

From the above, it is seen that if the clutching of the shafts 3 and 1 is attempted at the time when the perforation 9 is closely approaching alignment with the pin 8, the clutching is not effected until the next following revolution, the sleeve 6 being then released sufficiently before the perforation 9 again reaches alignment with pin 8 to insure the proper engagement of the pin within the perforation. At the same time springs 45 and 45ª serve to cushion the pin 8 from the shock of starting the mechanism driven by the shaft 3, allowing the shaft 1 to yield momentarily and then start together with shaft 3, the pin-and-slot connection between the plate 39 and the fixed pulleys insuring a positive connection to the shaft 1 after a limited relative angular rotation.

Having thus described one embodiment of this invention, though it is evident that many changes may be made therein without departing from the scope or spirit thereof, what is claimed is,—

1. In combination, driving and driven shafts, a clutch connection between said shafts, automatic means under the control of the operator for throwing said clutch either into or out of action at will, and automatic means, independent of said first mentioned means and including a timing element on said driving shaft and connections for timing the throwing in of the clutch.

2. A clutch mechanism comprising, in combination, a drive shaft, a driven shaft, mating clutch elements carried by the respective shafts and relatively movable into and out of clutching engagement, manually controlled clutch-operating means connected to one of said clutch elements, and automatic means for timing the clutching engagement of the clutch elements, said automatic means being actuated by the drive shaft and connected to control one of said clutch elements independently of said manually controlled means.

3. A clutch mechanism comprising, in combination, a drive shaft, a driven shaft, mating clutch elements carried by the respective shafts and adapted to couple the latter in a predetermined angular relation, means tending to operate one of said clutch elements to carry it into driving relation with the other clutch element, a manually controlled stop and connections for preventing movement of the clutch element under the influence of said means, and an automatic stop for timing the release of said last-mentioned clutch element, said automatic stop being connected to control said one of said clutch elements independently of said manually controlled stop.

4. A clutch mechanism comprising, in combination, a drive shaft, a driven shaft, a clutch element fixed to one of said shafts, a second clutch element slidable on the other of said shafts and having a throw-out cam associated therewith, a cam-follower in engagement with said cam, a manually operated stop adapted to be engaged by said follower, and an automatic stop operating independently of said cam and cam-follower to periodically hold and release said second clutch element.

5. A clutch mechanism comprising, in combination, a drive shaft, a driven shaft in alignment with said drive shaft, a collar having a perforation carried by said drive shaft, a second collar slidable longitudinally of said driven shaft toward and from said first collar, a pin carried by said second collar and arranged to engage the perforation of said first collar to clutch said shafts when said second collar is moved toward said first collar, a spring urging said second collar toward said first collar, a manually operated stop and connections for preventing the operation of said spring, and an automatic stop movable periodically into effective position and connected to control said second collar independently of said manually operated stop and connections, whereby to prevent the complete release of said second collar until said collars bear a predetermined angular relationship to one another favorable to their proper engagement with one another.

6. A clutch mechanism comprising, in combination, a drive shaft, a driven shaft in alignment with said drive shaft, a clutch element fixed on said drive shaft, a second clutch element slidably mounted on said driven shaft and movable into and out of engagement with said first clutch element, a spring tending to move and hold said clutch elements in clutching position, means for sliding said second clutch element out of clutching position, a stop operating independently of said means to prevent the initiation of movement of said second clutch element into clutching position, and means for moving and holding said stop out of retaining position during a portion of each revolution of said drive shaft.

7. A clutch mechanism comprising, in combination, a drive shaft, a driven shaft, a clutch element fixed to one of said shafts, a clutch element slidable on the other of said shafts into and out of clutching engagement with said fixed clutch element and having a cam groove therein, a lever pivoted at a fixed point and carrying on one arm a follower engaging said cam groove whereby said lever is oscillated by the rotation of said movable clutch element when in clutching position, means actuable to hold said lever from oscillation whereby said movable clutch element is moved out of clutching position by said cam groove and follower, a second lever pivoted at a fixed point and engaging said movable clutch element to be swung on movement thereof into and out of clutch position, a stop engaging the end of said second lever to prevent initiation of movement of said clutching element into clutching position, and means acting during a portion of each revolution of said drive shaft for retracting said stop out of the path of said second lever.

8. A clutch mechanism comprising, in combination, a drive shaft, a driven shaft, a clutch element fixed to said drive shaft, a clutch element slidable on said driven shaft into and out of clutching engagement with said fixed clutch element, a lever pivoted at a fixed point and engaging said slidable element to be swung by a sliding thereof, a rock shaft, an arm carried by said rock shaft and having its free end arranged to project in the path of said lever to prevent initiation of sliding movement of said slidable element into clutching position, a second arm fixed to said rock shaft, and a cam on said drive shaft acting on said second arm to rock said rock shaft to move and hold said first arm out of the path of said lever during a portion of each revolution of said drive shaft.

In testimony whereof, I have signed my name to this specification.

DONALD NOBLE.